Patented May 4, 1943

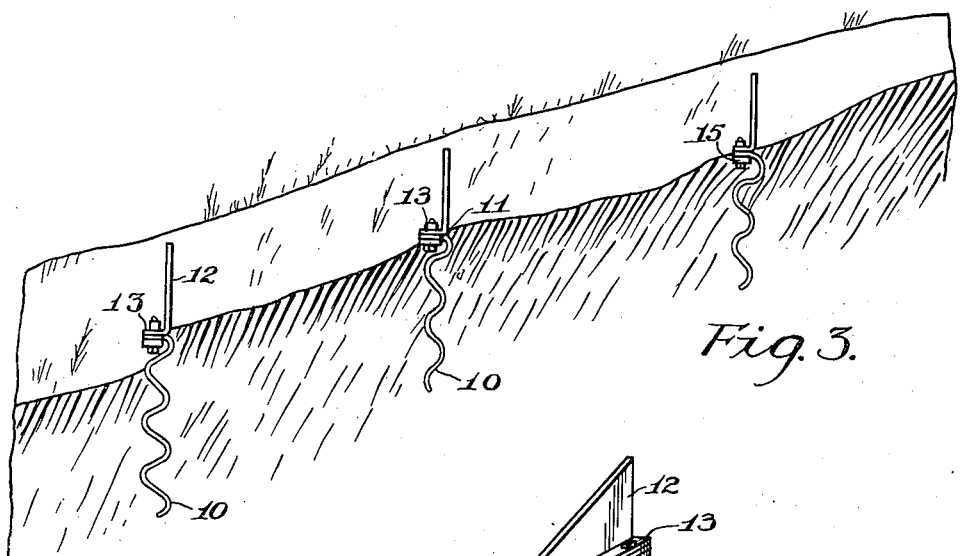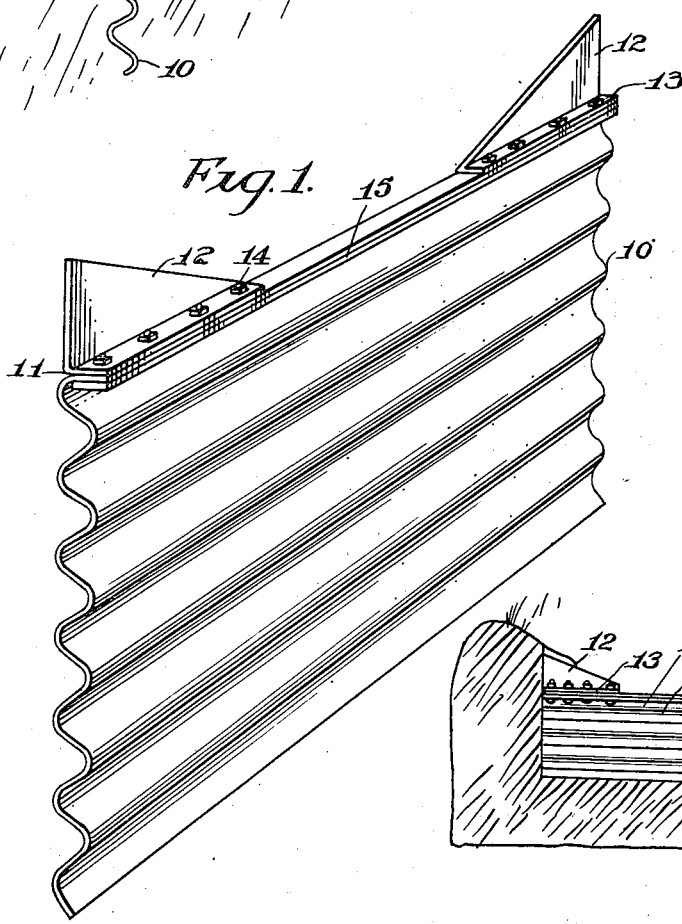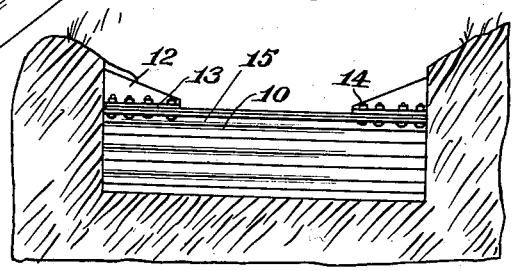

2,318,349

UNITED STATES PATENT OFFICE 2,318,349

EROSION CHECK DAM

Bryce R. Wiley, Des Moines, Iowa

Application December 2, 1940, Serial No. 368,183

1 Claim. (Cl. 61—35)

My invention relates to that class of erosion check dams for use in the so-called wash gullies in fields to be cultivated. Such check dams now in use are usually made of sheet metal provided with braces or reinforcements fixed thereto, to prevent buckling, and with pointed projections at their lower edges for adapting them to be driven into the ground for ease in removal and replacement.

The object of my invention is to provide a check dam of this class in which there is obtained a substantial saving in the cost of construction and a substantial saving in the cost of packing and transportation.

In the accompanying drawing—

Figure 1 shows a perspective view of my improved check dam fully assembled;

Figure 2 shows a sectional view of land at a wash gully, and transversely thereof, with my improved check dam in position therein; and Figure 3 shows a sectional view of land longitudinally of a wash gully and showing a series of my improved check dams in position therein.

Structural corrugated sheet metal of the kind now in common use for building purposes is customarily made in rectangular sheets with longitudinally arranged corrugation and with flat marginal edges about the sides thereof. The bracing and reinforcing characteristics of these corrugations is well known.

I preferably use such corrugated metal sheets of the so-called hot rolled copper bearing material. The corrugated sheets are indicated generally by the numeral 10, and the upper flat margin is bent at right angles.

For forming the wing members I employ triangular shaped flat sheet metal members 12, having their lower margins bent at right angles at 13. The said flanges 13 and 11 are punched to receive bolts 14.

On the under side of the flange 11 I place a flat reinforcing bar 15, also punched to receive the bolts 14, and whereby these three flanges are rigidly secured together. The points at which the greatest strains and stresses are applied is at these flanges, and by means of my improved construction I use corrugated sheet metal bodies of relatively light weight, thereby effecting an economy in construction and at the same time providing a strong and durable erosion check dam.

In installing my improved check dam I preferably employ a long narrow shovel and dig a slot in the ground transversely of the wash gully, and place the body member 10 therein with the top central portion at the center of and level with the wash gully. I then tamp the ground firmly into the slot and against the body member.

The completed structure has a maximum of strength to withstand the strains and stresses to which it is subjected in use, with the use of a minimum amount of material and a minimum of manufacturing cost. This is accomplished by the use of corrugated sheet metal bodies having a laterally extended flange forming a brace at the upper edge, and such braces are provided at no additional cost for the material, and at slight cost in forming the braces. Then, too, the wing members may be cut from flat sheets without any waste such as would occur if the wing members were integral with the body member.

Another advantageous feature of my device is that, a large number of the body members may be nested for packing, shipping and handling. Also, the wing members may be nested for the same purposes.

When installed, and due to the fact that both the upper edge of the body member and the lower edge of the wing member are provided with bracing and reinforcing flanges, and in addition thereto, a relatively heavy flat reinforcing bar is provided and all are firmly held together by bolts, a very rigid and durable check dam is provided.

Another advantageous feature of the level flange at the top of the body member is that, it forms an apron for carrying water over and beyond the upright surface of the check dam, thereby preventing erosion by water flowing down the surface of the body member by capillary action, because the water flows off the edge of the flange to a point beyond the body member.

I claim as my invention:

An erosion check dam, comprising a body portion formed of corrugated sheet metal with the corrugations running horizontally, the corrugation at the top of the sheet being flattened and projected rearwardly beyond the rear side of the body portion to form a spillway, the said top portion of the body portion being strengthened and reinforced at each side by a wing member of substantially triangular shape and having at its lower portion a flange fitted to the top surface of said upper edge portion and fixed thereto to also serve as wing members.

BRYCE R. WILEY.